United States Patent [19]

Akao et al.

[11] Patent Number: 4,903,834

[45] Date of Patent: * Feb. 27, 1990

[54] PACKAGE FOR THERMOSENSITIVE RECORDING MATERIALS

[75] Inventors: Mutsuo Akao, Kanagawa; Kotaro Nakamura; Takao Hayashi, both of Shizuoka, Japan

[73] Assignee: Fuji Photo Film Co., Ltd., Minami-Ashigara, Japan

[ * ] Notice: The portion of the term of this patent subsequent to Oct. 18, 2005 has been disclaimed.

[21] Appl. No.: 22,135

[22] Filed: Mar. 5, 1987

[30] Foreign Application Priority Data

Mar. 10, 1986 [JP] Japan .............................. 61-33208[U]
Apr. 19, 1986 [JP] Japan .............................. 61-59419[U]

[51] Int. Cl.$^4$ ............................................. B65D 81/30
[52] U.S. Cl. ................................... 206/410; 206/389; 428/215
[58] Field of Search ............... 206/316, 389, 397, 410, 206/455, 456, 484, 484.1, 524.2, 524.3; 229/3.5 R; 354/275; 355/72; 428/35, 311.7, 311.9, 311.1, 532-535, 537.5, 215; 242/55.53

[56] References Cited

U.S. PATENT DOCUMENTS

| | | | |
|---|---|---|---|
| 1,564,707 | 12/1925 | Palmer et al. | 206/455 |
| 4,356,224 | 10/1982 | Akao et al. | 206/455 |
| 4,359,499 | 11/1982 | Akao et al. | 206/455 |
| 4,513,050 | 4/1985 | Akao | 206/455 |
| 4,629,640 | 12/1986 | Akao | 428/35 |
| 4,708,896 | 11/1987 | Akao . | |
| 4,730,778 | 3/1988 | Akao et al. . | |
| 4,778,712 | 10/1988 | Akao . | |
| 4,778,713 | 10/1988 | Akao . | |

*Primary Examiner*—Jimmy G. Foster
*Attorney, Agent, or Firm*—Burns, Doane, Swecker & Mathis

[57] ABSTRACT

A package for diazo thermosensitive recording materials coiled round a core, which comprises a packaging paper being a water vapor permeability of more than 50 g/m$^2$.24 hours and comprising a light-reflecting paper layer located as outer layer and a light-shielding paper layer located as inner layer.

In the package of the invention, the packaging paper shields the recording material from the external heat and light. When internal humidity is increased such as by heating of the package such as higher than 50° C., moisture passes through the packaging paper to the outside. Accordingly, fogging by precoupling of the packaged diazo thermosensitive recording materials, irrespective of the fixation type or not, is remarkably decreased, and the quality of the recording material can be maintained for a long period during storage.

14 Claims, 2 Drawing Sheets

PACKAGE FOR THERMOSENSITIVE RECORDING MATERIALS

BACKGROUND OF THE INVENTION

1. Field of the Invention

This invention relates to a package for diazo thermosensitive recording materials. More particularly, this invention relates to a package suitable for diazo thermosensitive recording materials having a recording layer containing a diazonium salt, a coupling component and a coloring assistant provided on a fixable support. In the above recording layer, at least one of the diazonium salt, the coupling component and the coloring assistant is contained in microcapsules together with an organic solvent (except that the above three components are not contained in the same microcapsule).

2. Description of Prior Art

Recently, thermosensitive recording method has spread in the fields of facsimile and printer. As the thermosensitive recording materials for the above recording, leuco coloring thermosensitive recording materials are employed. The leuco coloring thermosensitive recording materials are superior in color concentration and coloring rate, but they have certain problems. That is, even after recording, they are stained by coloring caused by heating or adhesion of solvents, and moreover, they are discolored by a plasticizer such as contained in cellophane adhesive tape. In order to solve these defects, diazo thermosensitive recording materials have been developed. In these recording materials, a recording layer containing a diazonium salt, a coupling component and an alkali generator or a coloring assistant is provided, and after recording, unreacted diazonium salt is decomposed by light irradiation to lose its coloring ability (Japanese Patent KOKAI Nos. 57-123086 and 57-125092). However, in such diazo thermosensitive recording materials, precoupling gradually proceeds during preservation, and undesirable fogging occasionally appears. In order to avoid this fogging, either of the coupling component or the coloring assistant is made within nonpolar waxy material (Japanese Patent KOKAI Nos. 57-4414 and 57-142636) or capsules with a hydrophobic macromolecular material (Japanese Patent KOKAI No. 57-192944) and thereby it is isolated from other components. Besides, it is also known that preservability is improved by providing a protective coat of linear polystyrene resin of which the molecular weight is higher than 10,000. Particularly, fixation type diazo thermosensitive recording materials recently developed are superior because they have no such problems. The fixation type recording material has a recording layer containing a diazonium salt, a coupling component and a coloring assistant provided on a fixable support, and at least, one of the above three components is contained in microcapsules together with an organic solvent. In the case of this fixation type recording material, the microcapsules are not ruptured at the time of coloring reaction but the above reactive substances existing in and out of the microcapsules pass through the wall of the microcapsules by heating.

As the package for the thermosensitive recording materials requiring lightproofness such as the foregoing diazo thermosensitive recording materials, the packaging materials for photographic photosensitive materials including diazo photographic photosensitive materials were usually employed. The packaging materials for photographic photosensitive materials require various properties such as light-shielding, gas barrier, moisture-proofness, antistatic properties, physical strengths such as breaking strength, tear strength, impact puncture strength, Gelbo test strength and wear resistance, heat sealing properties such as heat seal strength, hot tack properties (hot-seal ability) and seal ability of contraries, flatness, slipping character and the like.

Generally, it is difficult to satisfy these properties with a single material. Therefore, a single layer film of a high-pressure low-density polyethylene (LDPE) kneaded with carbon black or a pigment, and a composite laminated film composed of a LDPE film and a flexible sheet such as paper, aluminum foil or cellophane, etc. have been employed. An example of a single layer packaging film is shown in FIG. 5. This film consists of a light-shielding LDPE film layer 5. Some examples of composite packaging films are shown in FIGS. 6–9. The film of FIG. 6 is composed of a light-shielding LDPE film layer 5 and a flexible sheet layer 6. The film of FIG. 7 is composed of a light-shielding flexible sheet layer 7 and a LDPE film layer 8. The film of FIG. 8 is composed of a light-shielding LDPE film layer 5, a light-shielding metal foil layer 9 and a flexible sheet layer 6. They are laminated in that order, an adhesive layer 4 is provided between each layers. The film of FIG. 9 is composed of a light-shielding paper layer 1 and a light-reflecting paper layer 2 laminated on it through an adhesive layer 4.

Thermosensitive recording materials 12 are usually coiled round a core 11, and its end is fastened by an adhesive tape. The above packaging film is coiled thereon in a cylindrical form, and both ends are turned and inserted into the core 11 as shown in FIG. 1. The core is usually made of paper or plastic.

However, when a diazo thermosensitive recording material was coiled round the core and wrapped up in the above film, fogging caused by precoupling occasionally appears during transportation or storage.

SUMMARY OF THE INVENTION

An object of the invention is to provide a package capable of preserving diazo thermosensitive recording materials for a long period without fogging.

In order to achieve this object, the inventor has investigated, and he has found that the precoupling was caused by the structure of package. That is, the foregoing conventional packaging film contains plastic layer(s) such as a polyethylene film layer 50–100 μm thick and the core is made of plastic or thick paper. Accordingly, the packaged recording marterial is put in a closed state, and heat and moisture are liable to accumulate in the package. Thereupon, when the packaged recording material is placed in the sunshine or at high temperature, precoupling of diazo compound proceeds by heat and moisture.

Accordingly, the package of the invention is characterized by a particular structure of the packaging paper capable of avoiding heat accumulation and passing water vapor well in addition to shielding light.

DETAILED DESCRIPTION OF THE INVENTION

Figure 1:
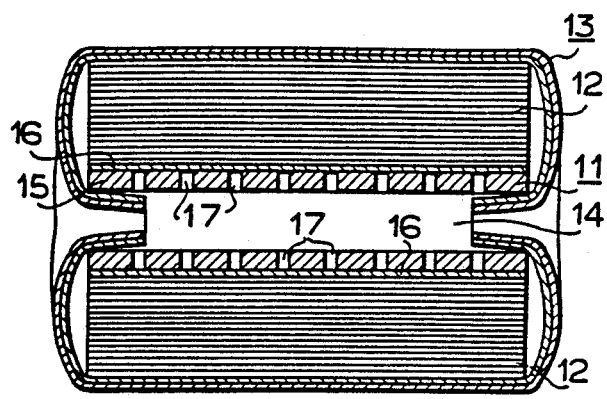
FIG. 1 is a sectional view indicating a preferred embodiment of the invention.

The packaging paper used for the package of the invention is composed of a light-reflecting paper layer located as outer layer and a light-shielding paper layer located as inner layer. Water vapor permeability of the packaging paper is more than 50 g/m$^2$.24 hours (JIS Z-0208, 40° C., 90% RH). When the water vapor permeability is less than 50 g/m$^2$.24 hours, release of heat and moisture from the inside of the package becomes insufficient. Additionally, fogging appears mainly at the central part in the longitudinal direction of the diazo thermosensitive recording materials packaged.

The light-reflecting paper layer is white, yellow, brown, a light color, silver, gold, or the like. Water vapor permeability based upon JIS Z-0208 is more than 50 g/m$^2$.24 hours, preferably more than 100 g/m$^2$.24 hours. In order to secure the water vapor permeability, physical strength and printability, density of the light-reflecting paper layer is usually 0.7 to 1 g/cm$^3$, preferably 0.8 to 0.95 g/cm$^3$, and its thickness is usually 20 to 150 μm, preferably 30 to 90 μm. As the light-reflecting paper layer, unbleached kraft paper, semibleached kraft paper, bleached kraft paper, unglazed kraft paper, unglazed bleached kraft paper, pure white wrapping paper, pure white machine-glazed paper, machine-glazed bleached kraft paper, ribbed kraft paper, duostress paper, raw baryta paper, clupak paper, machine-glazed kraft paper, thin simili, wood-free paper, shoji paper, raw art paper, raw coated paper, nonwoven fabric, and the like are usable. Among them, white machine-glazed paper and bleached kraft paper are preferable.

The light-shielding paper layer is paper colored to a light-absorptive color such as black, red or blue with dye, pigment or metal powder. As the coloring material, carbon black is preferable because of superiority in light-shielding, minor impurities and inexpensiveness. The most preferable light-shielding paper layer is a black paper colored with 1 to 15 wt.% of carbon black. Water vapor permeability of the light-shielding paper layer based upon JIS Z-0208 is more than 50 g/m$^2$.24 hours, preferably 100 g/m$^2$.24 hours. In view to secure light-shielding and the above water vapor permeability, density of the light-shielding paper is usually 0.7 to 1 g/cm$^3$, preferably 0.8 to 0.95 g/cm$^3$, and its thickness is usually 15 to 150 μm, preferably 50 to 120 μm. The light-shielding paper layer may be selected from the enumerated in the foregoing light-reflecting paper layer, and colored to use. Light-shielding papers for photographic purposes are also usable.

The light-reflecting paper layer may be joined with or separated from the light-shielding paper layer. For example, the packaging paper may be combination papers consisting of two or more layers including at least one light-reflecting paper layer coated as outer surface layer and one light-shielding paper layer. Such combination papers may be made by a cylinder machine, a double slice Fourdrinier machine or an Inverform machine having three slices. On the other hand, a light-reflecting paper layer may merely be superposed on a light-shielding paper layer. Use of an adhesive for joining the above two layers is not preferable in view of water vapor permeability. When these two layers are joined by an adhesive, the joining area by the adhesive is made less than 70% of total area, preferably 0–50%. Or, the thickness of the adhesive layer is made thinner than 50 μm, preferably 6–15 μm.

The adhesive may be a thermoplastic resin melting adhesive including a polyolefin adhesive, a hot melting type adhesive, gum adhesive or a solution type adhesive. The polyolefin adhesives include a homopolymer and a copolymer of an olefin such as various polyethylenes, polypropylenes, polybutenes and ethylene-propylene copolymers and L-LDPE, a copolymer of an olefin and another monomer such as ethylene-vinyl acetate copolymer, ethylene-acrylate ester copolymer (EEA, EMA, etc.), various ionomers ("SURLYN" Dupont, "Himiran" Mitsui Polychemicals Co., Ltd., etc.) and a graft copolymer. The solution type adhesives are divided into adhesives for wet lamination and adhesives for dry lamination. The adhesives for wet lamination are emulsion or latex. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination where paraffin wax, microcrystalline wax, ethylene-vinyl acetate copolymer, ethylene-ethylacrylate copolymer and etc. are blended, pressure-sensitive adhesives and temperature-sensitive adhesives may also be employed.

The core for coiling diazo thermosensitive recording materials is preferably made water vapor permeable. By using the permeable core, fogging near the core, although rarely occurring during transportation or storage can be improved.

Both ends of the core body preferably open as it is, and water vapor permeability of the peripheral wall of the core body is preferably more than 20 g/m$^2$.24 hours (JIS Z-0208). As such a core body, pipes having pores or holes are used. The core body may be made from a conventional core by boring holes. The number, shape and size of the holes are not limited and determined so as to bring the above-mentioned water vapor permeability. In order to secure light-shielding, a cover paper being light-shielding and a water vapor permeability of more than 20 g/m$^2$.24 hours is coiled once or several times round the core body to cover its peripheral face, if necessary. The cover paper is usually fastened such as by adhesion on surface of the core body. The cover paper may be selected from the enumerated in the foregoing light-shielding paper. When the core body made from a conventional core by boring holes is used in the packaging form of FIG. 1 or the like, the above cover paper is indispensable.

As the form of package, the packaging paper is coiled once or several times, preferably twice or three times, on a roll of diazo thermosensitive recording materials in a cylindrical form, and both side ends are turned and inserted into both open ends of the core body, as shown in FIG. 1. The packaging paper may be rounded to form a tube. In this case, both ends are pasted together in a form of superposition or back lining. A roll of the recording material is inserted into the tube, and both ends of the tube are turned and inserted into both open ends of the core body. The packaging paper may first be formed into a bag by pasting each open edge of a superposed packaging papers leaving one open edge. A roll of the recording material is inserted into the bag, and its open end is turned and inserted into an open end of the core body. In any form of the above, open end(s) of the packaging paper may be sealed instead of or in addition to the above insertion into the core body. In this case, moisture going out through the core is released through the packaging paper. However, mere insertion of the end of the packaging paper as shown in FIG. 1 is preferable in view of effective release of heat and moisture accumulated in the roll of the recording material. The adhesive for the packaging paper may be selected from the enumerated previously.

The package of the invention is applicable to any diazo thermosensitive recording material, however, it is effective as the package for the fixation type diazo thermosensitive recording materials. This recording material has a recording layer containing a diazonium salt, a coupling component and a coloring assistant provided on a fixable support, and at least, one of the above three components is contained in microcapsules together with an organic solent. In the case of this fixation type recording material, the microcapsules are not ruptured at the time of coloring reaction but the above reactive substances existing in and out of the microcapsules pass through the wall of the microcapsules by heating. By the presence of an organic solvent, fogging during preservation remarkably decreases, and coloring rate and concentration remarkably increases.

The diazonium salt has a general formula $ArN_2^+X^-$ where Ar represents a substituted or unsubstituted aryl group, $N_2^+$ represents diazonium, and $X^-$ represents an acid anion. This diazonium salt reacts with a coupling component to form a color, and it is decomposed by light. The diazonium compound to form the above salt includes 4-diazo-1-dimethylaminobenzene, 4-diazo-1-diethylaminobenzene, 4-diazo-1-dipropylaminobenzene, 4-diazo-1-methylbenzylaminobenzene, 4-diazo-1-dibenzylaminobenzene, 4-diazo-1-ethylhydroxyethylaminobenzene, 4-diazo-1-diethylamino-3-methoxybenzene, 4-diazo-1-dimethylamino-2-methylbenzene, 4-diazo-1-benzoylamino-2,5-diethoxybenzene, 4-diazo-1-morpholinobenzene, 4-diazo-1-morpholino-2,5-diethoxybenzene, 4-diazo-1-morpholino-2,5-dibutoxybenzene, 4-diazo-1-anilinobenzene, 4-diazo-1-toluylmercapto-2,5-diethoxybenzene and 4-diazo-1,4-methoxybenzoylamino-2,5-diethoxybenzene.

Examples of acid anion include $C_mF_{2m+1}COO^-$ (m is 3-9), $C_nF_{2n+1}SO_3^-$ (n is 2-8), $C_pF_{2p+1}SO_2)_2CH^-$ (p is 1-18),

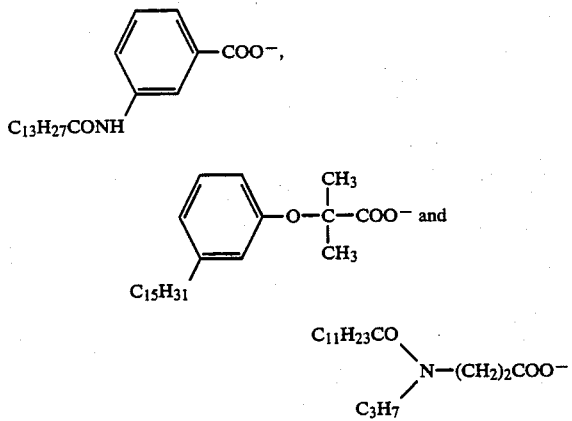

Such a diazonium salt is dissolved or suspended in an organic solvent, and microcapsules containing this solution or suspension are made by polymerization of a raw material for wall materials such as interfacial polymerization, external polymerization or internal polymerization to form the wall material of microcapsules. The wall material is not necessary to melt by heat at the time of coloring reaction, and the melting point of the wall material is preferably high because preservability of unused recording material is rather raised. As the wall material, polyurethane, polyurea, polyamide and polyester are preferable. The organic solvent is water-insoluble and its boiling point is preferably higher than 180° C. Suitable organic solvents include phosphoric acid esters, phthalic acid esters other carboxylic acid esters and fatty acid amides. Dibutyl phthalate, diethyl phthalate, dibutyl maleate and tricresyl phosphate are particularly preferable. Other components, i.e. a coupling component and a coloring assistant, may also be entrapped into microcapsules similarly. However, when all reactive components, i.e. a diazonium salt, a coupling component and a coloring assistant, are contained in the same microcapsule, fogging proceeds irrespective of the package of the invention.

Diazo thermosensitive recording materials are explained in detail by H. Sato (Nippon Kagaku Zasshi, 11, 2111–2115 (1985)).

In the package of the invention, the packaging paper shields the recording material from the external heat and light. When internal humidity is increased such as by heating of the package such as higher than 50° C., moisture passes through the packaging paper to the outside. Accordingly, fogging by precoupling of the packaged diazo thermosensitive recording materials, respective of the fixation type or not, is remarkably decreased, and the quality of the recording material can be maintained for a long period during storage.

EXAMPLES

FIG. 1 is a sectional view indicating a diazo thermosensitive recording material packaged by an example of the package of the invention.

As shown in this drawing, a diazo thermosensitive recording material 12 is coiled round a cylindrical core 11 to form a roll, and its end is fastened by an adhesivek tape. A packaging paper 13 is coiled twice thereon in a cylindrical form, and both ends are turned and inserted into the central hollow part 14 of the core 11. Many small holes 17 are bored to penetrate through wall of the core body 15, and a cover paper 16 is coiled once round it. The cover paper 16 is fastened on the core body 15 by an adhesive.

Figure 2:
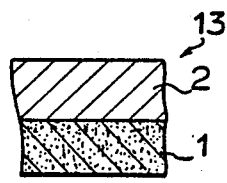
FIGS. 2 to 4 are partial sectional views of packaging papers usable for the package of the invention.

A partial sectional view of the packaging paper 13 is, as shown in FIG. 2, composed of an inner face light-shielding paper layer 1 and an outer face light-reflecting paper layer 2. This packaging paper 13 is a combination paper made by a cylinder machine.

Figure 3:
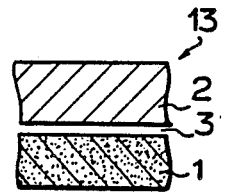

Another example of the packaging paper 13 is shown in FIG. 3. In this packaging paper 13, an inner face light-shielding paper layer 1 is separated from an outer face light-reflecting paper layer 2. 3 indicates a space.

Figure 4:
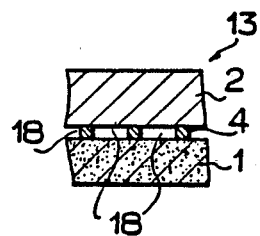

Another example of the packaging paper is shown in FIG. 4. In this example, an inner face light-shielding paper layer 1 is joined to an outer face light-reflecting paper layer 2 through an adhesive layer 4 having a space 18. In this adhesive layer 4, and adhesive is applied on either surface of the above paper layers 1, 2 to form many dots by gravure coating method so that adhesive area becomes 2%.

Subsequently, occurrence of fogging was tested as to the package of the invention, and the results were compared with other packages.

In the package of Example 1, the packaging paper of FIG. 2 was employed. The light-shielding paper layer 1 was made of 67 wt.% of hardwood pulp (LP), 27 wt.% of softwood pulp (NP) and 6 wt.% of carbon black. Its density was 0.92 g/cm$^3$, and its thickness was 67 μm. The light-reflecting paper layer was made of 60 wt.% of LP and 40 wt.% of NP, and its thickness was 55 μm. As the core body 15, a porous pipe "NETLON" (DAI-NIPPON PLASTICS Co., Ltd.) made of polypropylene net of 3 inches inside diameter and 210 mm length was employed, and a black paper 75 μm thick having the same composition as the above light-shielding pper layer 1 was employed as the cover paper 16.

In the package of Example 2, the packaging paper of FIG. 3 was employed. The light-shielding paper layer 1 was made of 67 wt.% of LP, 27 wt.% of NP and 6 wt.% of carbon black. Its density was 0.92 g/cm$^3$, and its thickness was 75 μm. A white bleached kraft paper being 0.89 g/cm$^3$ in density and 67 μm thick was employed as the light-reflecting paper layer 2. Many small holes 17 were bored to penetrate through wall of a paper core of 3.5 inches inside diameter, 210 mm length and 5 mm in wall thickness so that areal ratio of holes to total surface area became 40%, and this paper core was used as the core body 15. The same light-shielding paper layer of Example 2 was employed as the cover paper 16.

In the package of Example 3, the packaging paper of FIG. 4 was employed. The light-shielding paper layer 1 and the light-reflecting paper layer 2 were the same as those of Example 2. While, the core body 15 and the cover paper 16 were the same as those of Example 1.

In the package of Example 4, the packaging paper of FIG. 3 was employed. The light-shielding paper layer 1 and the light-reflecting paper layer 2 were the same as those of Example 2. The core 11 was a paper core of 3 inches inside diameter, 5 mm in wall thickness and 210 mm length without providing holes or cover paper.

In the package of Example 5, the packaging paper of FIG. 3 was employed. As the light-shielding paper 1, a black paper having the same composition as Example 2, 0.93 g/cm$^3$ in density and 98 μm thick was employed.

The light-reflecting paper layer 2 was a pure white machine-glazed paper of 0.90 g/cm$^3$ in density and 55 μm thick. The core 11 was the same as Example 4.

Figure 9:
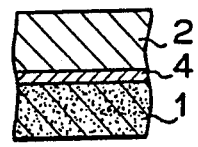

In Comparative package 1, the packaging paper of FIG. 9 was employed. The light-shielding paper layer 1 and the light-reflecting paper layer 2 were the same as Example 2. The adhesive layer 4 was LDPE resin layer being 20 μm thick, and it was provided by extrusion laminating. The core 11 employed was the same as Example 4.

Comparative package 2 was the same as Example 4 except that a light-shielding LDPE film layer 5 containing 3 wt.% of carbon black and being 50 μm thick was employed instead of the light-shielding paper 1.

Figure 5:
FIGS. 5 to 9 are partial sectional views of conventional packaging papers.

In Conventional package 1, the packaging material of FIG. 5 was employed. The content of carbon black was 3 wt.%, and thickness of the light-shielding LDPE film layer was 70 μm. The core was the same as Example 4.

Figure 6:
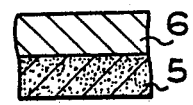
Figure 7:
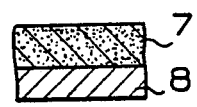
Figure 8:
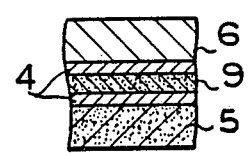

In Conventional package 2, the packaging material of FIG. 6 was employed. The flexible sheet layer 6 was unbleached kraft paper of 0.87 g/cm$^3$ in density and 80 μm thick, and the light-shielding LDPE film layer 5 being 30 μm thick contained 3 wt.% of carbon black and was provided by extrusion laminating. The core was the same as Example 4.

In the above Comparative and Conventional examples, "DFD-0111" (MI; 2.4 g/10 minutes, Density; 0.923 g/cm$^3$, NIPPON UNICAR Co., Ltd.) was employed as LDPE in the light-shielding LDPE layer 5, "MIRASON 14" (MI; 5.1 g/10 minutes, Density; 0.919 g/cm$^3$, MITSUI POLYCHEMICALS Co., Ltd.) was employed as the LDPE adhesive layer, and "#44B OIL FURNACE CARBON BLACK" (Mean Particle Size; 21 mμ, pH 7.7, MITSUBISHI CHEMICAL INDUSTRIES Ltd.) was employed as the carbon black, respectively.

The recording material packaged in each package was a fixation type diazo thermosensitive recording material of 100 meters length.

Each example was placed in a thermostatic oven, and allowed to stand at 55° C. for 42 hours. Then, each recording material was taken out, and fogging was measured to determine its Macbeth density.

Constitution of all examples are listed in Table 1, and the results are listed in Table 2.

TABLE 1

|  | Invention | | | | | Comparative | | Conventional | |
|---|---|---|---|---|---|---|---|---|---|
|  | 1 | 2 | 3 | 4 | 5 | 1 | 2 | 1 | 2 |
| Packaging Film Layer Constitution | FIG. 2 | FIG. 3 | FIG. 4 | FIG. 3 | FIG. 3 | FIG. 9 | (FIG. 3) | FIG. 5 | FIG. 6 |
| Outer Layer | White Paper | Bleached Kraft Paper | " | " | Machine-glazed Paper | Bleached Kraft Paper | " | — | Unbleached Kraft Paper |
| (thickness(μm)) | 55 | 67 | 67 | 67 | 55 | 67 | 67 | — | 8 |
| Adhesive Layer | — | — | Hot-Melt Adhesive | — | — | LDPE | — | — | — |
| (area (%)) | — | — | 2 | — | — | 100 | — | — | — |
| (thicknesss(μm)) | — | — | 10 | — | — | 20 | — | — | — |
| Inner Layer | Light-Shielding Paper | " | " | " | " | " | Light-Shielding LDPE Film | " | " |
| (thickness(μm)) | 67 | 75 | 75 | 75 | 98 | 75 | 50 | 70 | 30 |
| Core | Network Porous Pipe | Paper Core with Holes | Network Porous Pipe | No Hole Paper Core | " | " | " | " | " |

TABLE 2

|  | Invention | | | | | Comparative | | Conventional | |
| --- | --- | --- | --- | --- | --- | --- | --- | --- | --- |
|  | 1 | 2 | 3 | 4 | 5 | 1 | 2 | 1 | 2 |
| Fogging | | | | | | | | | |
| Topmost Part | A | B | B | B | B | E | E | E | E |
| (Macbeth Density) | 0.131 | 0.148 | 0.151 | 0.152 | 0.162 | 0.383 | 0.937 | 0.987 | 0.574 |
| Middle Part | C | C | C | — | — | E | — | E | E |
| (Macbeth Density) | 0.193 | 0.206 | 0.221 | | | 0.833 | | 0.992 | 0.882 |
| Core Part | A | B | B | — | — | E | — | E | E |
| (Macbeth Density) | 0.128 | 0.143 | 0.146 | | | 0.876 | | 0.986 | 0.936 |
| Printability | A | A | A | A | A | A | A | D | C |
| Heat-Shielding | B | A | A | A | A | B | A | E | C |
| Light-Shielding | B | B | B | B | A | B | B | B | B |

Evaluations in Table 2 were carried out as follows;

| A | Very Excellent | D | Having a Problem |
| --- | --- | --- | --- |
| B | Excellent | E | Impractical |
| C | Practical | | |

Testing methods were as follows;

| Thickness | JIS P-8118 |
| --- | --- |
| Water Vapor Permeability | JIS Z-0208 |

Light-Shielding Character:

A diazo thermosensitive recording material was packaged by each packaging material, and the package was exposed to the light of 80,000 luxes for one hour. The light-shielding character was estimated by the fogging degree of the diazo thermosensitive recording material.

We claim:

1. A package for diazo thermosensitive recording materials coiled round a core, which comprises a packaging paper having a water vapor permeability of more than 50 g/m².24 hours, said packaging paper consisting essentially of a light-reflecting paper layer located as outer layer and a light-shielding paper layer located as inner layer.

2. The package of claim 1, wherein color of said light-reflecting paper layer is white, yellow, brown, a light color, silver or gold.

3. The package of claim 2, wherein said light-reflecting paper layer is 0.7 to 1 g/cm³ in density and 20 to 150 μm in thickness.

4. The package of claim 3, wherein said light-reflecting paper layer is white machine-glazed paper or bleached kraft paper.

5. The package of claim 1, wherein said light-shielding paper layer is a black paper containing 1 to 15% by weight of carbon black.

6. The package of claim 5, wherein said light-shielding paper layer is 0.7 to 1 g/cm³ in density and 15 to 150 μm in thickness.

7. The package of claim 1, wherein said light-reflecting paper layer is joined to said light-shielding paper layer.

8. The package of claim 7, wherein said packaging paper is a combination paper of said light-reflecting paper layer and said light-shielding paper layer.

9. The package of claim 7, wherein said joining is made by an adhesive of which joining area is less than 70% of total area or of which thickness is thinner than 12 μm.

10. The package of claim 1, wherein said light-reflecting paper layer is separate from said light-shielding paper layer.

11. The package of claim 1, wherein the diazo thermosensitive recording materials are coiled around the core and both ends of the body of said core are open and water vapor permeability of the peripheral wall of the said core is more than 20 g/m².24 hours.

12. The package of claim 11, wherein said core body consists of a pipe having pores or holes and a light-shielding cover paper covering its peripheral face.

13. The package of claim 1, wherein either or both side ends of said packaging paper is inserted into open end(s) of said core body.

14. The package of claim 1, wherein said diazo thermosensitive recording materials are the to the fixation type.

* * * * *